CHARACTER READING SYSTEM WITH SUB MATRIX

Filed Oct. 20, 1960 3 Sheets-Sheet 1

INVENTOR

Jacob Rabinow

BY Joseph A. Genovese

ATTORNEY

INVENTOR
Jacob Rabinow
BY
Joseph A. Genovese
ATTORNEY

INVENTOR

Jacob Rabinow

BY Joseph A. Genovese

ATTORNEY

United States Patent Office 3,182,290
Patented May 4, 1965

3,182,290
CHARACTER READING SYSTEM WITH SUB MATRIX

Jacob Rabinow, Takoma Park, Md., assignor to Control Data Corporation, Minneapolis, Minn., a corporation of Minnesota Filed Oct. 20, 1960, Ser. No. 63,786
20 Claims. (Cl. 340—146.3)

This invention relates to character recognition machines, methods and techniques, and more particularly to systems for high speed identification of printed material.

Considerable ingenuity and effort has been directed toward the development of machines and techniques for identifying characters, particularly in recent years. The J. Rabinow et al. Patent No. 3,104,369 discloses a reading machine which can use the best match technique claimed in the J. Rabinow U.S. Patent No. 2,933,246. The operation of the machine entails scanning a character area in a manner as though a hypothetical $x$–$y$ axes grid were superimposed thereon. The scan information is gated into a matrix of flip flops, each having two outputs which may be either high or low with regard to a reference level. These outputs are termed "assertions" and "negations" respectively. The flip flop matrix forms a pattern which, for the purpose of explanation may be thought of as simulating the hypothetical grid. The circuitry is such that upon completion of a scan of the given character area, the outputs of the flip flops are available as assertion or negation voltages which are fed to correlation resistor matrices.

The resistor matrices are so connected with the flip flops that the matrix which is wired for a given character, produces the "best" (highest) output voltage when that character is scanned. This best voltage is selected to furnish a "single hot wire" output, characteristic of the scanned character so that it may be fed into a computer, to a buffer storage, a printer or to any other utilization circuit or device.

Philosophically, Patent No. 3,104,369 discloses a map matching system with the best match occuring between the scanned character and the memory for that character. The system recognizes characters by seeking similarities between the scanned character and the memory made of capacitance or resistor matrices. At least one resistor matrix is required for each character to be identified; and in the best match voltage selector, the component count including transistors, diodes, etc., is quite high. Secondly, major portions of many characters are identical and such portions yield essentially no useful information for distinguishing these characters from each other. Yet, in direct map matching, components for the repeating portions of these characters are required.

My present invention distinguishes from the disclosure in Patent No. 3,104,369 by first seeking general similarities between the scanned (unknown) character and predetermined groups of characters, and further examining only a predetermined highly significant portion of the unknown character for distinctions between the scanned character and other characters within the group. My invention provides a more powerful technique for detecting correlation between the unknown character and the references in the memory of resistor matrices. My system is more powerful because it enables the machine to emphasize the investigation of the distinguishing (and hence important) features and details of the characters without greatly increasing the component count. Since my present invention does not necessarily require the assertions and negations of the flip flops described in Patent No. 3,104,369 to be fed to a separate single resistor matrix for each possible character, the number of matrices and circuitry associated therewith are reduced. This reduction is brought about by letting a single resistor matrix represent a homogeneous group of characters, e.g. C, O, G and Q. The step in the art which my invention takes, improves the reliability of prior reading techniques by intensifying the examination of the features of characters of a small group which distinguish those characters from each other. When a character is recognized as falling within a group (I refer to this as the "best match gross recognition") my invention intensely investigates only those features of the characters within that group which distinguish the characters from each other. I call this my "best match fine recognition."

An object of my invention is to provide a character recognition machine and technique which makes a gross recognition of the unknown character, determining that it is one character of a particular group, and then makes a fine recognition by investigating small area of the character possessing features which distinguish the characters from each other within the selected gross recognition group.

Another object of my invention is to provide a character identification system which relies on the map matching technique but which emphasizes the investigation of small areas having features which distingush the characters from each other.

Other objects and features of importance will become apparent in following the description of the illustrated form of the invention.

Figures 2, 3:
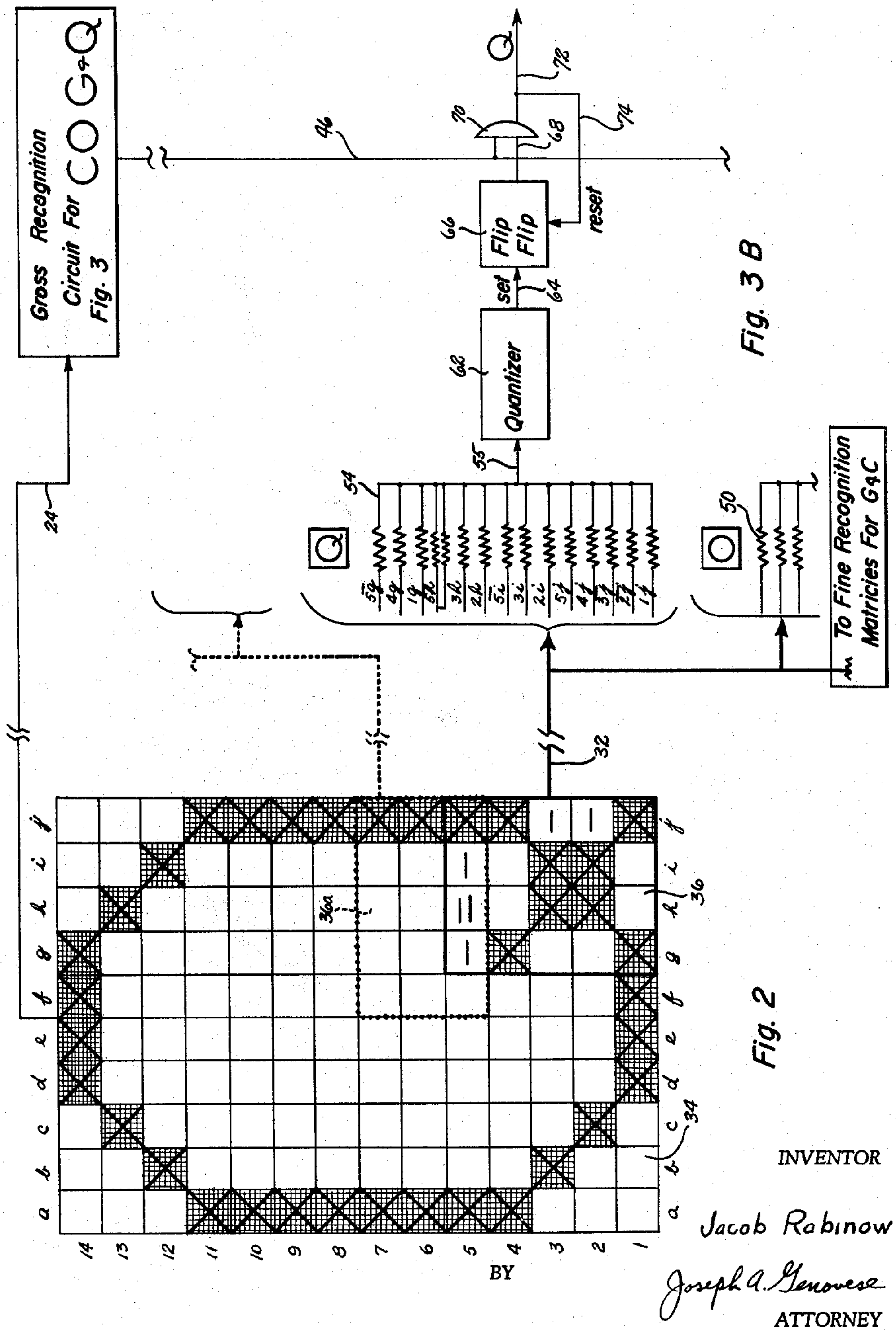
FIGURE 2 is a schematic view which shows a matrix together with two sub matrices used to distinguish between the characters C, O, G and Q.
FIGURE 3 is a diagrammatic view showing my gross recognition circuits for two groups of characters.
Figure 3:
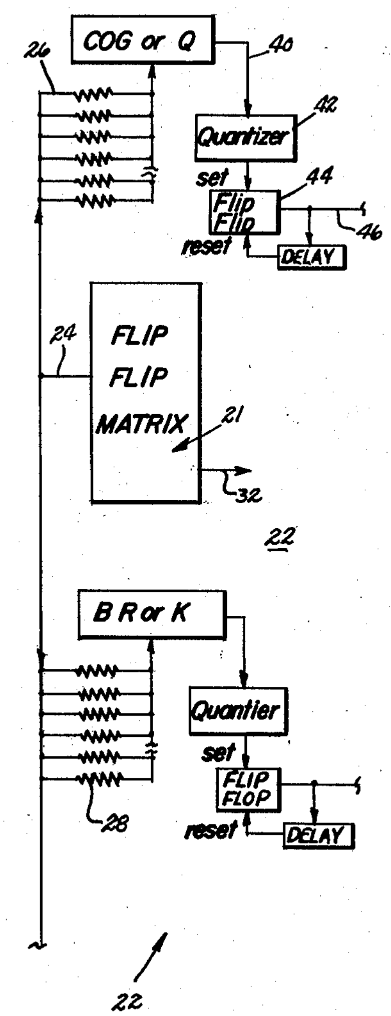
Figure 3A:
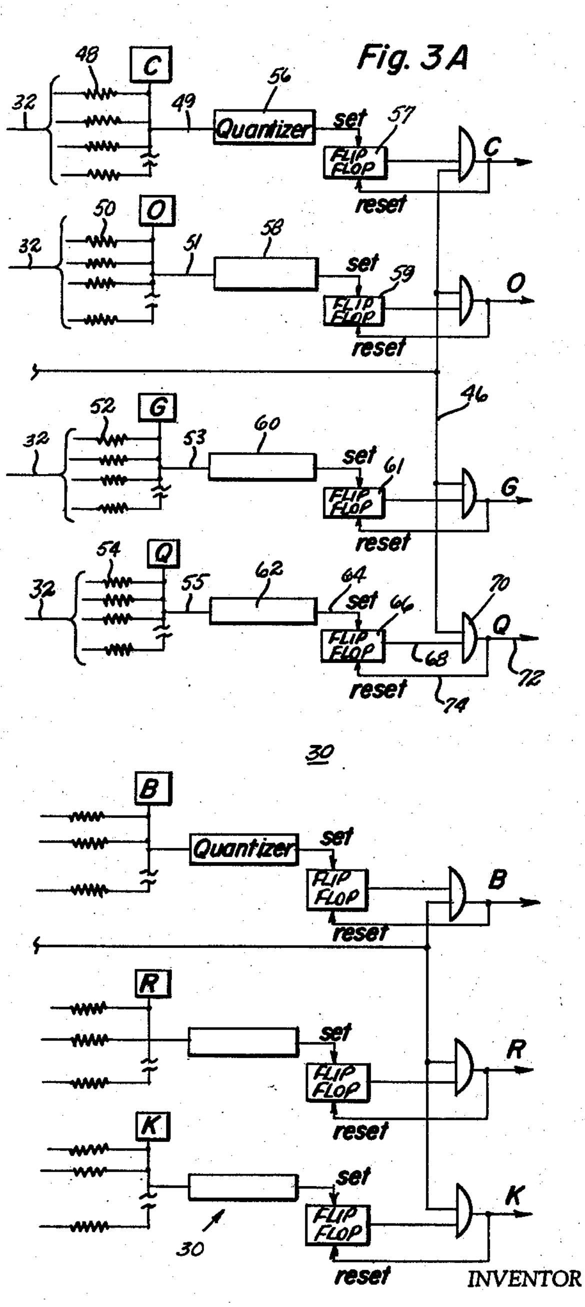

FIGURE 3*a* is a diagrammatic view showing my fine recognition circuits operatively connected with the two illustrated gross recognition circuits of FIGURE 3.

FIGURE 3*b* is a diagrammatic view showing more details of the fine recognition circuit for the character Q and wiring connections between it and one fine recognition resistor sub matrix.

Figure 4:
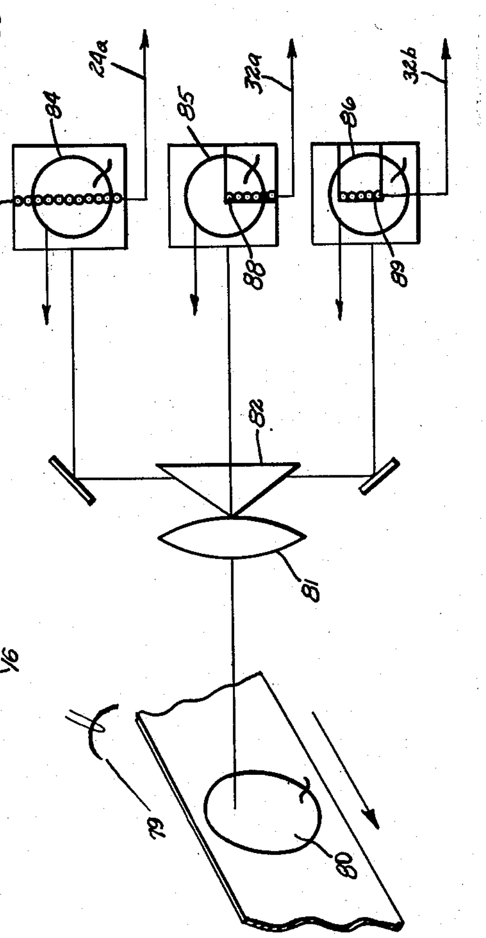

FIGURE 4 is a partial schematic view showing another embodiment of the invention.

The technique of my invention is as follows: The unknown character, e.g. Q, is identified as one of a homogeneous group of characters by finding similarities between the unknown character and the characters of the group. At the same time a parallel operation is performed to seek the dissimilarities between the unknown character and those of the same homogeneous group. Pictorially, assume that the character appears on a matrix 34 (FIGURE 2), the fine recognition search for dissimilarities is accomplished by investigating the information content of one or more sub matrices 36, **36*a***, etc.

Figure 1:
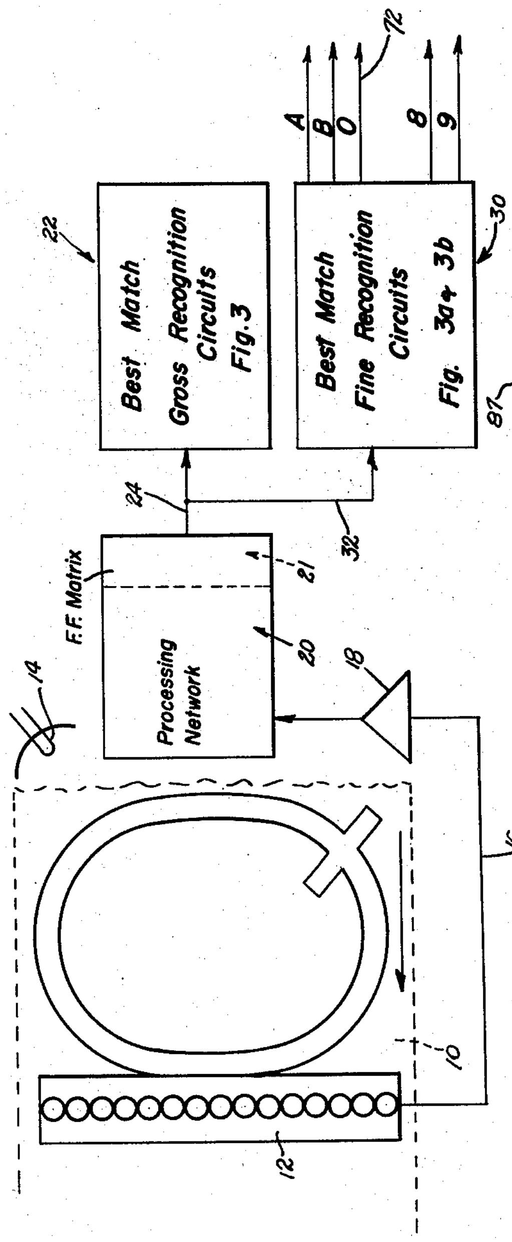
FIGURE 1 is a block diagram showing my system.

The system of FIGURE 1 shows one possible relationship of subassemblies required to practice my invention. The illustrated character Q on an area 10 is scanned by photocell scanner 12. The J. Rabinow et al. Patent No. 3,104,369 discusses scanning techniques, and the subject matter thereof is incorporated herein by reference. For simplicity, assume that the area 10 is illuminated by source 14, and the reflection of the area falls on the scanner 12 to provide scan output information on conductor 16, which is amplified as at 18, and processed by network 20. The processing network 20 includes all of the circuitry diagrammatically shown in FIGURE 1 of the above patent from the scanner amplifiers up to and including the assertion and negation wires of the flip flop matrix which I have schematically indicated at 21 in FIGURE 3.

The outputs of network 20 are fed to my best match gross recognition circuits or circuit network 22 by way of line 24. The gross recognition circuits have resistor sections or matrices which are the same as network 70 in FIGURE 1 of the above patent, except the resistor matrices 71 of that patent are wired for individual characters. My present invention has this distinction: Instead of a single resistor matrix for each character, a single matrix, for instance matrix 26 or matrix 28 of FIGURE 3, is wired to provide a match voltage output for a homogeneous or related group of characters.

My best match fine recognition circuit network 30 (FIGURE 1) is capable of investigating sub matrices (FIGURE 2) at the same time that network 22 investigates the information content of the matrix developed by the network 20. Line 32 is connected with line 24 of the gross recognition network 22, and with the fine recognition circuit network 30. A few of the final output lines of the fine recognition circuit network are fragmentarily shown in FIGURE 1, my system preferably, but not necessarily, providing a single hot output which is adapted to be connected with a utilization device.

Referring to FIGURE 2, matrix 34 presents the appearance of the letter Q by having the assertions of the flip flops 21 (FIGURE 3) characterized by an X, while the negations are represented by a dash. Although the letter Q would appear on matrix 34 as the assertion voltages, my gross recognition network does not distinguish between the C, O, G and Q, since it utilizes only a few of these assertions which are common to this group. To make a distinction between the letters of this group I rely on my fine recognition circuits 30 which interrogate a sub matrix, for example sub matrix 36 of matrix 34 for information content. Sub matrix **36*a* is useful to determine whether the unknown character (FIGURE 1) is a G. The positions of sub matrices 36 and 36*a* have been selected to show that the sub matrices may overlap. They may be located anywhere within a matrix 34 to investigate the distinguishing features between characters of a group. Obviously, the sub matrices for the group having characters B, R and K will be in different locations because the features distinguishing these characters from each other appear in locations different from those shown at 36 and 36*a*** of FIGURE 2.

FIGURE 3 shows some of the details of gross recognition circuit network 22. The resistor matrix 26 in conjunction with the disclosed system in Patent No. 3,104,369 provides an output on line 40 indicating that the unknown character is either a C, O, G or Q. The output is a signal voltage fed to a conventional quantizer 42 which is a voltage level discriminator. The quantizer may be made in numerous ways, for instance it may be a Schmitt trigger or an analogous circuit. The usual circuit technique of a quantizer followed by a one-shot multivibrator could also be used. The quantizer (or one-shot) output is applied to flip flop 44 providing an output on line 46 which is fed back by way of a delay, to flip flop 44 to reset it. The gross recognition circuit network for the characters, B, R and K is identical, these being given by way of example. Any number of gross recognition circuits are used, as required.

My fine recognition circuit network 30 is shown in FIGURE 3*a*. Considering first the example involving the character group C, O, G and Q, we have seen that there is an output on line 46 indicating a determination that the unknown character is one of these. At the same time the sub matrix 36 investigates the lower-right-hand corner (FIGURE 2) of matrix 34 in this way: The outputs of the pertinent flip flops in matrix 21 i.e. those responsible for positions 1–5, *g–j* inclusive, are wired with best match resistor sections or matrices 48, 50, 52 and 54. The specific wiring is described subsequently. In general, though, it is clearly understandable that the matrices 48, 50, 52 and 54 are wired to different flip flop assertion and negation positions of the sub matrix 36, **36*a*, etc., within matrix 34** to distinguish characteristic features of the characters C, O, G and Q.

The outputs of matrices 48, 50, 52 and 54 are applied to lines 49, 51, 53 and 55 respectively, and fed to quantizers 56, 58, 60 and 62. There is a high correlation between the outputs and one of the resistor matrices, 54 in the given example, and there will be a proportionately higher output signal on line 55 than on lines 49, 51 and 53. For simplicity, the quantizers 56, 58, 60 and 62 are assumed to have a threshold voltage below which they will not operate. Assume then, that the outputs on lines 49, 51 and 53 are about ½ volt, and 2 volts are required to operate the quantizers. For the Q the voltage on only line 55 will be above this threshold whereby only quantizer 62 will provide an output on its line 64 to set flip flop 66. The corresponding output lines and flip flops associated with quantizers 56, 58 and 60 will be below the quantizer threshold voltage. Here again, one shot multivibrators may be interposed between the quantizers 56, 58, 60, 62 and flip flops 57, 59, 61 and 66. Alternatively, I may use a best match selector in place of the quantizers and/or one-shot multivibrators. The best match selector would be essentially the same as disclosed in the J. Rabinow et al. patent.

Flip flop 66 becomes set providing an output on line 68 which is AND gated at 70 with the gross recognition signal on line 46. Since AND gate 70 is a two input AND gate and both inputs are satisfied, there will be a single output on line 72 identifying the unknown character as a Q. Flip flop 66 is reset by having the signal on line 72 fed back as at 74 to the flip flop 66. The flip flops 57, 59 and 61 associated with quantizers 56, 58 and 60 are connected with individual AND gates and line 46 in a manner identical to that described in connection with flip flops 66 and its gate 70. The fine recognition circuitry for the group containing characters B, R or K, is identical to the above described fine recognition circuit network.

I have repeated the showing of fine recognition resistor matrix 54 (for the letter Q) in FIGURE 3*b* to show more specifically how the sub matrix 36 is used. Resistor matrix 54 has a resistor for each of the output (assertion or negation) positions of sub matrix 36, and these are wired with the corresponding flip flops of matrix 21. I prefer to show some negations, for instance position **5*g*** and 3*j* and also to show weighted positions, for instance the double negation 5*h*, merely to indicate that this expedient may be resorted to. Sub matrix **36*a*** has its output wires connected with fine recognition circuit networks (not shown) for the further investigation of the unknown character as its electronic image appears on the flip flop matrix.

FIGURE 4 is a schematic view showing another way of practicing my invention. The optical scanning system is very similar to those disclosed in my Patent No. 2,933,-246, where a light 79 is made to illuminate the character area 80. The light reflected from the character area is projected by lens 81 onto the surfaces of multiface mirror 82 to produce three separate images 84, 85 and 86. Any number of images may be projected depending on the number of faces of mirror 82.

In this form of my invention I scan the images 84, 85 and 86 with three rows 87, 88 and 89 of photocells to produce scan information corresponding to that required for my gross recognition (row 87) and also for my fine recognition (rows 88 and 89). Row 87 scans the entire image of the Q, while row 89 scans what would correspond to positions 5, 6 and 7, *f* through *j* in FIGURE 2. Row 88 scans positions 1–5, *g* through *j* of FIGURE 2, i.e. sub matrix 36. The outputs of the rows of photocells are available on lines **24*a*, 32*a* and 32*b* which correspond to lines 24 and 32** of FIGURES 1–3*b*. From these points, the operation of this form of the invention is the same as described previously.

The vertical position of the sub matrices is obtained by the position of the photocells rows 88 and 89. The horizontal boundaries are established by "read" signals obtained as described in Patent No. 3,104,369. The read signals cause rows 88 and 89 to conduct at the position indicated. An advantage of this embodiment is that high resolution scanning of the sub matrix areas is quite easily obtained, i.e. by using many closely positioned photocells in rows 88 and 89. This has the effect of closely examining the critical areas of the character, while the gross examination is made comparatively coarsely.

For the sake of brevity I have explained my invention by referring to Patent No. 3,104,369. It should be clearly understood, however, that the principles disclosed herein are by no means limited to any particular machine process, or technique. For example, the principle of the invention applies regardless of the method of scanning, storage, or recognition. It applies not only to optical characters, but also to magnetic, or any other.

I have used the term "character" herein in the general sense. The characters may be of any font, may be letters, numbers, symbols, etc. Further, changes, alterations and modifications may be made without departing from the philosophy of my invention and scope of the claims therefor.

I claim:

1. Apparatus to identify characters of a family comprising; means for examining the unknown character and seeking similarities between the unknown character and the characters of the family to determine that the unknown character is similar to characters of a homogeneous group within said family; means providing a first signal characteristic of said group and means for examining at least one portion of the unknown character to detect differences in the unknown character which distinguish said unknown character from the other characters of said homogeneous group and providing a second signal characteristic thereof; and means responsive to said first and second signals to identify the unknown character.

2. In a machine for identifying characters of a family, means including a scanner providing outputs which vary as a function of the shape of the character; means fed by said outputs for determining that the unknown character is one of a particular group within said family where the group is composed of characters having similar features, and providing a signal identifying said group; means fed by a portion of said outputs for ascertaining differences between characters of said group in a sub-area of the unknown character and providing a signal identifying the unknown character as one of said group.

3. The machine of claim 2 wherein said differences ascertaining means includes a network providing an electrical signal, and means to combine the group and said character signals.

4. Character recognition apparatus for an unknown character on an area comprising a photosensitive scanner for systematically investigating area elements in the form of a grid of such elements covering substantially the entire area and producing an output for each area element in which a portion of said character falls, means responsive to said outputs to convert said outputs to a plurality of available signals corresponding to the optical conditions of said grid, a gross recognition circuit network providing a plurality of references representing groups of possible characters, and means for supplying the available signals of said plurality to said gross network to provide an output signal identifying said unknown character as a character within a particular one of said groups.

5. Character recognition apparatus for an unknown character on an area comprising a photosensitive scanner for systematically investigating area elements of said area in the form of a grid of such elements covering substantially the entire area and producing an output for each area element, means responsive to said outputs to convert said outputs to a plurality of available signals responding to the optical conditions of said grid, a gross recognition circuit network providing a plurality of references representing groups of possible characters, the available signals of said plurality being fed to said gross network to provide an output signal identifying said unknown character as a character within a particular one of said groups, a fine recognition circuit network providing a plurality of references representing features which distinguish the individual characters of the last-mentioned group, and means for conducting a predetermined portion of said plurality of signals to said fine recognition network and for applying them to the last-mentioned references in a manner to obtain correlation signals for identifying said unknown character as a particular character of said particular group.

6. The apparatus of claim 5 wherein said output signal identifying said unknown character as a character within a particular one of said groups is an electrical signal, and said fine recognition circuit network having means to combine said electrical signal with the said correlation signals.

7. In reading machine for unknown characters wherein said machine provides a plurality of signals representative of the unknown character, the improvement comprising gross recognition means responsive to said plurality of signals for providing an output to indicate that the unknown character is one of a small group of similarly shaped characters, and fine recognition means responsive to a portion of said plurality of signals to distinguish the unknown character from the others of said small group on the basis of features distinguishing the unknown character from various characters of said group.

8. The combination of claim 7 wherein said fine recognition means include a plurality of correlation signal providing devices for fractions of the characters, and means for combining the output of said gross recognition means with the correlation signals of said devices to provide a character identity signal.

9. A character reading system comprising a scanner for an area containing an unknown character and providing coverage of the area in the form of a grid, a scanner output processor network providing a matrix corresponding to said grid and containing information at stations of the matrix responding to positions of said grid at which said scanner sees the features of the unknown character, gross recognition means fed by said information for determining by correlation means that the unknown character is one of a comparatively small group, said gross recognition means providing an output signifying the said group, and fine recognition means fed by a part of said information to investigate a sub matrix of said matrix and provide an output on the basis of the best correlation of features of said unknown character with the characters of said comparatively small group of characters.

10. In a system to recognize a character on an area, means to scan the area by a systematic investigation of area elements and to produce a signal for each area element where each signal is a function of the optical quality of its area element, and conversion means responsive to said signals for producing a unique set of values corresponding to the character, the improvement comprising a gross recognition circuit network for applying said set of values to known references representing groups of possible characters and for producing a signal indicative of the group having the highest correlation with said values, and means for applying a portion of said set of values to other known reference representing distinctions between characters of a group and producing a signal which identifies the character from said possible characters of the group selected by said gross recognition network.

11. A system to identify a character which is one of a family wherein there are groups of approximately similarly shaped characters within said family; means to inspect the unknown character for similarities between the unknown character and the characters of said groups and for providing a first output identifying the group with which said unknown character belongs; and means to examine a part of the unknown character for differences between the unknown character and corresponding parts of all of the characters within said group and provide an output identifying the unknown character.

12. The subject matter of claim 11 wherein said means to examine a part of the unknown character for differences include fine recognition means which examine said part in greater detail than examined by said inspect means.

13. The subject matter of claim 11 wherein said means to inspect the unknown character for similarities include a scanner providing scan signals, a temporary memory device to store said scan signals, and character-group defining means to which the stored signals are compared to provide said first output which identifies the unknown character with a said group.

14. Apparatus to identify a character of a family which has groups of similarly shaped characters, said apparatus comprising a scanner, means operatively associated with said scanner to provide a set of outputs which correspond to the unknown character on an area, a gross recognition means having comparison sections, each section corresponding to one of said groups respectively, means to apply said set of outputs to said sections, means to provide a signal identifying the group of characters whose section most closely correlates with said set of outputs, a fine recognition means having additional comparison sectons, each of said additional comparison sections corresponding to features of the characters of said group which distinguishes these characters from each other, means to apply only a portion of said set of outputs to said additional sections, and means responsive to the functioning of said additional sections to provide a signal identifying the said additional section which has the highest correlation with said portion of said set of outputs.

15. Apparatus to identify a character of a family which has groups of similarly shaped characters, said apparatus comprising an optical character scanner, means operatively associated with said scanner to provide a set of outputs which correspond to the unknown character on an area, a gross recognition network having electrical comparison sections, each section corresponding to one of said groups respectively, means to apply said set of outputs to said sections, means to provide an electrical signal identifying the group of characters whose section most closely correlates with said set of outputs, a fine recognition circuit network having additional electrical comparison sections, each of said additional comparison sections corresponding to features of the characters of said group which distinguish these characters from each other, means to apply only a portion of said set of outputs to said additional sections, means responsive to the functioning of said additional sections to provide an electrical signal identifying the said additional section which has the highest correlation with said portion of said set of outputs, and logical means to combine said electrical signals and provide a single output identifying the unknown character.

16. In a reading machine for identifying characters, means to examine an unknown character and provide outputs which bear a relationship to the unknown character, means responsive to said outputs for providing a signal which narrows the identity of the unknown character to one of a group, and means responsive to said outputs for providing a signal which at least further narrows the identity possibilities of the unknown character within said group.

17. In a character reading machine, the combination of means for making a coarse classification of an unknown character to identify said character as one of a group possessing similar features within a family of characters, and means for determining the identity of the unknown character from the characters of said group thereby excluding all other possible characters in the determination of the identity of the unknown character.

18. In a character reading machine for a family of characters where some of the characters have common features and constitute a group within the family, means to coarsely examine an unknown character to identify the unknown character with a group thereby narrowing the number of possibilities from which to choose when identifying the unknown character provide a group-identity signal and means responsive to said group-identity signal for causing the identification of the unknown character to be made from the identified group.

19. The subject matter of claim 13 wherein said means to examine a part of the unknown character are operative with said temporary memory device.

20. In a character reading machine for a family of characters where some of the characters have common features and constitute a group within the family, means to coarsely examine an unknown character to identify the examined character with a group thereby narrowing the number of possibilities from which to choose when ultimately identifying the examined character, and means to more finely examine a distinguishing portion of said examined character to ultimately identify the examined character within the characters of said groups.

References Cited by the Examiner

UNITED STATES PATENTS

| | | | |
|---|---|---|---|
| 2,718,356 | 9/55 | Burrell | 340—149 |
| 2,795,705 | 6/57 | Rabinow | 340—149 |
| 2,898,576 | 8/59 | Bozeman | 340—149 |
| 2,919,425 | 12/59 | Ress | 340—149 |
| 2,932,006 | 4/60 | Glauberman | 340—149 |

OTHER REFERENCES

Publication A: Bailey, C.E.G., "Introductory Lecture, Session 1—Character Recognition," Proceedings—Institution of Electrical Engineers, Part B, September 1959, pp. 444–449.

Publication B: Mauchley, "Sorting and Collating," vol. III, Theories and Techniques for Design of Electronic Digital Computers, Moore School of E.E.U. of Penna., June 30, 1948, pp. 22-1 to 22-6.

MALCOLM A. MORRISON, *Primary Examiner.*

IRVING L. SRAGOW, *Examiner.*